United States Patent
Balk et al.

(10) Patent No.: US 9,309,808 B2
(45) Date of Patent: Apr. 12, 2016

(54) TURBOPROP PROVIDED WITH A BLADE-POSITIONING DEVICE

(75) Inventors: Wouter Balk, Melun (FR); Gilles Alain Charier, La Grande Paroisse (FR); François Gallet, Paris (FR)

(73) Assignee: SNECMA, Paris (FR)

(*) Notice: Subject to any disclaimer, the term of this patent is extended or adjusted under 35 U.S.C. 154(b) by 821 days.

(21) Appl. No.: 13/578,926

(22) PCT Filed: Feb. 11, 2011

(86) PCT No.: PCT/FR2011/050293
§ 371 (c)(1),
(2), (4) Date: Aug. 14, 2012

(87) PCT Pub. No.: WO2011/098736
PCT Pub. Date: Aug. 18, 2011

(65) Prior Publication Data
US 2012/0308385 A1    Dec. 6, 2012

(30) Foreign Application Priority Data
Feb. 15, 2010    (FR) ...................... 10 51031

(51) Int. Cl.
*B64C 11/32* (2006.01)
*F02C 6/20* (2006.01)
*F01D 7/00* (2006.01)

(52) U.S. Cl.
CPC .............. *F02C 6/206* (2013.01); *B64C 11/32* (2013.01); *F01D 7/00* (2013.01); *F05D 2220/325* (2013.01)

(58) Field of Classification Search
CPC ........... F02C 6/206; B64C 11/32; F01D 7/00; F05D 2220/325
USPC .............. 416/153, 162, 168 R, 127; 60/226.2
See application file for complete search history.

(56) References Cited

U.S. PATENT DOCUMENTS

| 3,873,236 A | 3/1975 | Gall |
| 4,657,484 A * | 4/1987 | Wakeman et al. ............ 416/127 |

(Continued)

FOREIGN PATENT DOCUMENTS

| EP | 0 203 881 | 8/1988 |
| EP | 1 921 325 | 5/2008 |
| FR | 2 908 451 | 5/2008 |

OTHER PUBLICATIONS

International Search Report for PCT/FR2011/050293.

*Primary Examiner* — Christopher Verdier
*Assistant Examiner* — Aaron R Eastman
(74) *Attorney, Agent, or Firm* — Pillsbury Winthrop Shaw Pittman LLP (57) ABSTRACT

A turboprop provided with a blade-positioning device including a stationary nacelle, a rotary nacelle including a plurality of blade roots, a turbine, the stationary and rotary nacelles and the turbine being coaxial along a longitudinal axis, a blade positioning device including for each blade a device configured to transform movement suitable for transforming a translation movement into a rotation movement, each one of the device for transforming movement being secured to the rotary nacelle and being suitable for pivoting a blade. The positioning device is placed between the inner surface of the stationary nacelle and the outer surface of the turbine, the positioning device including a member including a body secured to the stationary nacelle and a rod for sliding along an axis substantially parallel to the longitudinal axis.

11 Claims, 6 Drawing Sheets

(56) References Cited

U.S. PATENT DOCUMENTS

| | | | | |
|---|---|---|---|---|
| 4,704,862 A | * | 11/1987 | Dennison et al. | 60/226.2 |
| 4,718,823 A | * | 1/1988 | Dennison | 416/162 |
| 2003/0077173 A1 | * | 4/2003 | Franchet et al. | 416/30 |
| 2009/0146515 A1 | * | 6/2009 | Popov et al. | 310/90.5 |

* cited by examiner

TURBOPROP PROVIDED WITH A BLADE-POSITIONING DEVICE

CROSS REFERENCE TO RELATED APPLICATIONS

This application is the U.S. National Stage of PCT/FR2011/050293, filed Feb. 11, 2011, which in turn claims priority to French Patent Application No. 1051031, filed Feb. 15, 2010, the entire contents of all applications are incorporated herein by reference in their entireties.

The present invention relates generally to a turboprop provided with a blade positioning device, and more particularly to a turboprop provided with a blade positioning device for contra-rotating propellers.

Document FR2908451 describes a turboprop that comprises a blade assembly with adjustable orientation. The turboprop particularly comprises a rotary housing that is attached in fixed manner to a turbine rotor. The blades are attached to the rotary housing in fixed manner and are coupled with a ring-shaped cylinder supported on the rotary housing for the purpose of adjusting their orientation. The ring-shaped cylinder comprises two chambers separated by a piston; these are supplied with actuating fluid via two conduits that pass through the turbine rotor and connect with the stator of this turbine close to the turboprop shaft, where a plurality of actuating fluid distribution chambers are arranged, with fluid-tight rotating unions.

According to such a construction, the ring-shaped cylinder is mounted fixedly on the rotary housing, which means that the ring-shaped cylinder also rotates. The two actuating fluid supply conduits are connected at a first end to the rotating ring-shaped cylinder, and at the opposite end thereof to the distribution chambers for the actuating fluid, which are located on the stator. For the conduits, this involves a transition from a rotating point (rotary housing) to a stationary point (stator). The conduits are furnished with rotating joints in such manner as to assure their fluid-tightness.

One drawback associated with this type of device consists in that the practically continuous demands imposed on the rotating joints causes them to degrade rapidly.

A further drawback associated with this type of device consists in that there are risks of the fluid becoming coked through the conduits and these risks are associated primarily with the high temperature environment created by the turbine through which the conduits pass.

A more particular aim of the invention is therefore to rectify the drawbacks of the devices described in the preceding. In this context, the object of the invention is to suggest a turboprop provided with a blade positioning device that is not vulnerable to a risk of coking and has a longer service life. A further object of the invention is to suggest a turboprop provided with a blade positioning device that is easily accessible and thus enables maintenance activities to be carried out easily.

To this end, the invention relates to a turboprop provided with at least one blade positioning device comprising:
  a stationary nacelle,
  at least one rotary nacelle comprising a plurality of blade roots,
  a turbine, said stationary and rotary nacelles and said turbine being coaxial in a longitudinal axis, referred to as longitudinal axis x,
  said blade positioning device comprising for each blade a movement transformation means suitable for transforming a translation movement into a rotation movement, each of said movement transformation means being secured to said rotary nacelle and being suitable for pivoting a blade.

Said positioning device is placed between the inner surface of said stationary nacelle and the outer surface of said turbine, said positioning device comprising at least one member comprising a body secured to said stationary nacelle and a rod suitable for sliding along an axis substantially parallel to said longitudinal axis x.

One benefit of the invention is that the liquid used to control the member is not exposed to a risk of coking. This advantage is assured by the fact that the positioning device is located entirely in an environment (between the external surface of the turbine in the internal surface of the stationary nacelle) in which the temperature never exceeds 120° C.

Another benefit of the invention is that maintenance activities are facilitated by the fact that the positioning device is located entirely outside the turbine. In fact, as a result of this feature the positioning device is very easily accessible.

According to a particularly advantageous embodiment, said positioning device comprises interface means located between said at least one member and said movement transformation means, said interface means being suitable for:
  transmitting a translation movement of said rod to said movement transformation means,
  uncoupling said member from said movement transformation means in such manner that when said rotary nacelle is rotating the at least one member is not caused to rotate as well by said movement transformation means.

Thus, according to this particularly advantageous embodiment, unlike the turboprops of the prior art the member is not subject to rotary movement, so that it is possible to avoid premature wear of the blade positioning device for a propeller, particularly with regard to the supply conduits which are located according to the invention in a stationary site, so there is no change of site. Advantageously, it is not necessary to use rotating joints to ensure that the passthroughs for the conduits are sealed against leaks at all times, and enabling the rod of the member to be guided from a rotating site (the rotor) to a stationary site (the stator).

Besides the main features which have been outlined in the preceding paragraph, the turboprop provided with a blade positioning device according to the invention may also include one or more of the additional characteristics listed in the following, which may be considered individually or in any technically feasible combination thereof:
  said rod is suitable for cooperating with a first ring of longitudinal axis x, said first ring being designed to be moved in translation under the influence of said rod, said first ring being guided in translation by a guide ring of longitudinal axis x secured in fixed manner to said stationary nacelle;
  said movement transformation means comprising:
    a second ring of longitudinal axis x,
    for each blade, a linkage extending essentially parallel to said longitudinal axis x, said linkage being connected to a specified blade root and comprising a finger located at a first end and a finger located at a second end thereof,
    said fingers being disposed perpendicularly relative to longitudinal axis x,
  said finger located on the first end being designed to cooperate with said second ring to such effect that when said second ring undergoes a translation movement, said linkage also undergoes a translation movement,
  said finger located on the second end being offset relative to said predetermined blade root and being designed to cooperate with said predetermined blade root to such effect that when said linkage undergoes a translation movement, said predetermined blade root undergoes a rotation movement.

said movement transformation means comprising:
  a second ring of longitudinal axis x,
  for each blade:
    toothed rack being connected fixedly to said second ring, said toothed rack being essentially parallel to said longitudinal axis x,
    a bevel gearwheel that is coaxial with a predetermined blade root and located at the base of said blade root,
    a pinion having an axis of rotation that is perpendicular to a perpendicular axis of said longitudinal axis x, comprising
      a first gearwheel designed to cooperate with said toothed rack,
      a second bevel gearwheel designed to cooperate with the bevel gearwheel described in the preceding;

said interface means are formed by a bearing of longitudinal axis x, comprising a first bushing mounted in fixed manner on said first ring, and a second bushing mounted in fixed manner on said second ring, such that:
  when said rod of said at least one member undergoes a translation movement, said translation is transmitted to said movement transformation means via said bearing,
  when said rotary nacelle and said movement transformation means undergo a rotation movement, said at least one member is uncoupled from the rotation movement via said bearing;

for each blade, said interface means comprise:
  a first shaft perpendicular to said longitudinal axis x, connected in fixed manner to said first ring, said first shaft comprising a first coaxial bearing,
  a second shaft perpendicular to said longitudinal axis x, connected in fixed manner to said first ring, said second shaft comprising a second coaxial bearing, said second ring comprising an internal ferrule that separates said first and second coaxial bearings such that:
  when said rod of said at least one member undergoes a translation movement, said translation, is transmitted to said movement transformation means via the first or second coaxial bearing,
  when said rotary nacelle and said movement transformation means undergo a rotary movement, said at least one member is uncoupled from the rotary motion of said movement transformation means via said first and second coaxial bearings;

said interface means comprise:
  a primary magnet formed by a first ferrule attached in fixed manner to said second ring, said primary magnet being disposed on an internal wall of said second ring,
  two secondary magnets, each of which is formed by a second ferrule, attached in fixed manner to said first ring, said two secondary magnets being disposed on an external wall of said first ring and being kept apart from one another by said primary magnet, such that:
    when said secondary magnets undergo a translation movement via said rod, this translation movement is transmitted to said movement transformation means by the magnetic repulsion between said primary and secondary magnets,
    when said rotary nacelle and said movement transformation means undergo a rotary movement, said at least one member is isolated from said rotary movement;

said blade positioning device comprises a plurality of members numbering from three to six;

said turboprop comprises a second rotary nacelle that includes a plurality of blade roots, said plurality of blade roots of said second rotary nacelle being designed such that it is able to be positioned by a second positioning means that falls within the definition of the invention.

Other characteristics and advantages of the invention will become clearly apparent upon reading the description that follows, which is provided solely for illustrative purposes and is in no way limiting of the invention, and with reference to the accompanying attached drawing, in which.

For the sake of clarity, only the elements that are helpful for an understanding of the invention are represented in the figures, which are drawn without reference to scale or diagrammatic convention. Moreover, when similar elements appear in different figures, they are identified with the same reference numerals.

For the purposes of the rest of the description, the terms nacelle and propeller are used interchangeably.

Figure 1:
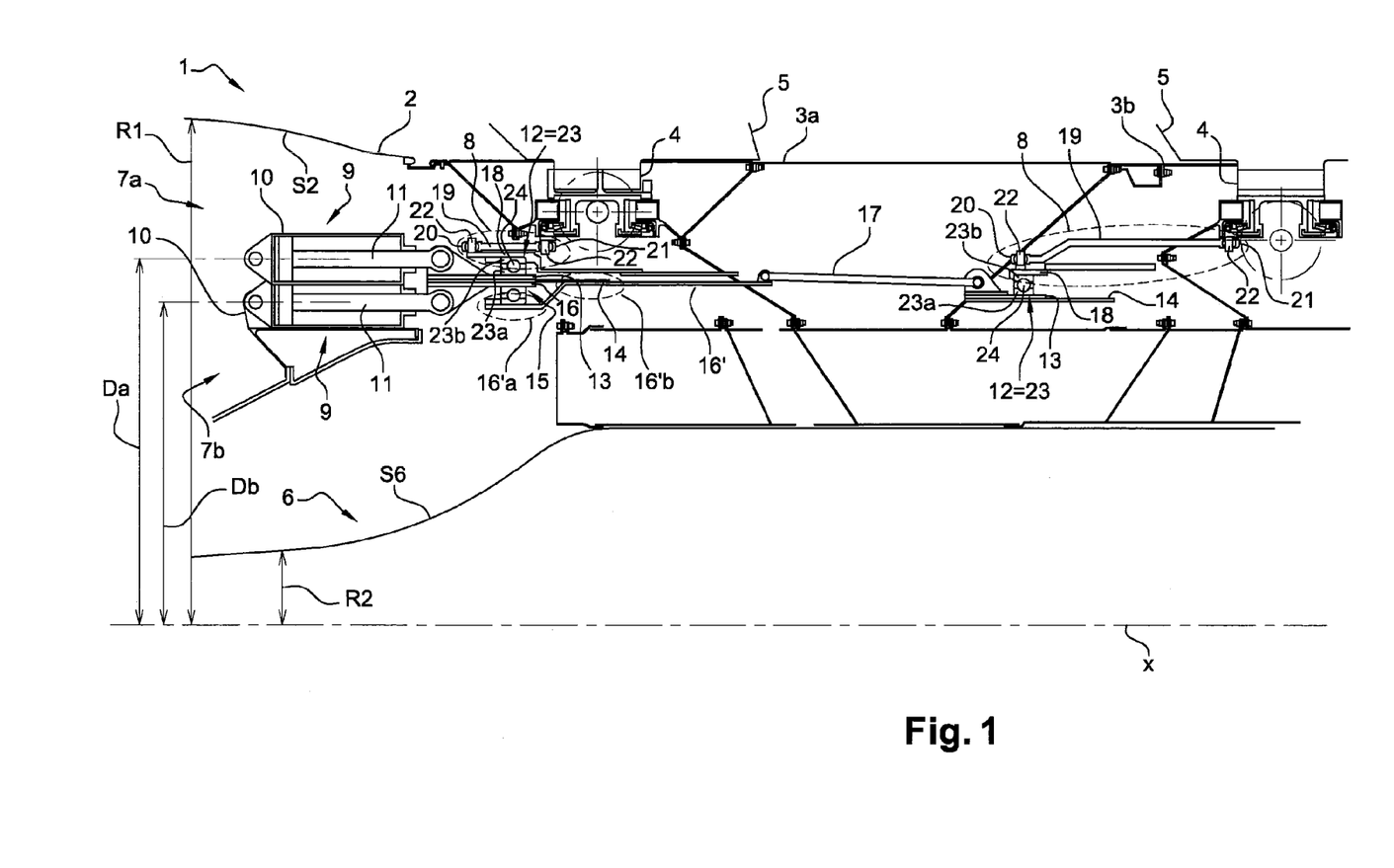
FIGS. 1 and 2 show schematically an example of a turboprop according to a first embodiment of the invention.

FIG. 1 shows a part of a turboprop 1 comprising, according to the example, a stationary nacelle 2 and two rotary nacelles 3a and 3b, each of which comprises a plurality of roots 4 of blades 5 whose respective positions are adjustable. Rotary nacelles 3a and 3b are designed to rotate in opposite directions according to a longitudinal axis x.

Nacelles 2, 3a and 3b particularly comprise a turbine 6 that is coaxial with longitudinal axis x. Rotary nacelles 3a and 3b are mounted fixedly on the rotor (not shown) of turbine 6.

In other words, stationary nacelle 2 is positioned in a stationary mounting, unlike rotary nacelles 3a and 3b, which are positioned on a rotating mounting.

According to the invention, turboprop engine 1 is provided with two blade positioning devices 7a and 7b. For the time being, in order to facilitate understanding of the invention, only one positioning device will be described (positioning device 7a, which serves to position the blades 5 belonging to rotary nacelle 3a, it being understood that the two positioning devices 7a and 7b are for all intents and purposes identical; it should be noted that the identical elements included positioning devices 7a and 7b are identified by the same reference numerals. In general, positioning device 7a serves to enable positioning of the blades 5 included on rotary nacelle 3a, and it comprises:

for each blade 5, movement transformation means 8, which are designed such that they are capable of transforming a translation movement into a rotary movement; movement transformation means 8 are attached fixedly to rotary nacelle 3a and are able to cause a blade 5 of rotary nacelle 3a to pivot, a member 9 comprising a body 10 secured to stationary nacelle 2 and a rod 11 suitable for sliding along an axis substantially parallel to longitudinal axis x; consequently, body 10 and the control conduits (not shown) that enable rod 11 to slide in one direction or the other are located entirely inside a stationary site; in the example shown in FIG. 1, member 9 is a cylinder, interface means 12 located between member 9 and movement transformation means 8. Interface means 12 are designed to be able to:

transmit a translation movement of rod 11 to movement transformation means 8, uncouple member 9 from movement transformation means 8 during rotation such that when rotary nacelle 3a is induced to rotate, member 9 is not caused to rotate as well by movement transformation means 8.

In general, it should be noted that positioning devices 7a and 7b are each located between internal surface S2 of stationary nacelle 2 and external surface S6 of turbine 6.

In other words, positioning devices 7a and 7b are located at distances Da and Db respectively from longitudinal axis x, which are greater than radius R2 of turbine 6 and smaller than radius R1 of the stationary nacelle. This means that positioning devices 7a and 7b are in an environment where the temperature is below 120° C. Because of this defining feature, it is possible to avoid the occurrence of coking.

Additionally, bodies 10 of members 9 are secured to stationary nacelle 2, which serves to prolong the service life of the bodies. In fact they are not subjected to any rotary movement at all that might cause premature wear.

In the example shown in FIG. 1, rod 11 of each member 9 is designed such that one of its ends is able to cooperate with a first ring 13 of longitudinal axis x. First ring 13 is also guided in translation by a guiding ring 14 of longitudinal axis x and secured on stationary nacelle 2. The function of this guiding ring 14 is to guide first ring 13 in translation along an axis substantially parallel to longitudinal axis x when the first ring is influenced by a translation movement generated by rod 11.

In the case of device 7a, which is attached to rotary nacelle 3a, rod 11 is connected directly to first ring 13.

On the other hand, in the case of device 7b, which is attached to rotary nacelle 3b, rod 11 is attached to first ring 13 via a bearing 15, a ring 16, a ring 16' and an arm 17 formed in our example by a linkage rod.

It should be noted that ring 16' comprises a first part 16'a and a second part 16'b. Second part 16'b of ring 16' makes contact with guiding ring 14, which serves to guide first ring 13 during translation. Accordingly, ring 16' is also guided in translation by guiding ring 14.

First part 16'a is mechanically linked to ring 16 via bearing 15. Thus, when rod 11 is caused to perform a translation movement, ring 16' is also caused to perform a translation movement; on the other hand, rod 11 is uncoupled from ring 16' via bearing 15 during rotation.

Ring 16' is connected to a first ring 13 via arm 17, which has the form of a linkage rod, for example.

Reflecting the positioning devices 7a and 7b shown in FIG. 1, movement transformation means 8 comprise:

a second ring 18 of longitudinal axis x, a linkage rod 19 substantially parallel to longitudinal axis x and comprising a finger 22 located at a first end 20 and a finger 22 located at a second end 21 thereof, the two fingers 22 being arranged perpendicularly with respect to longitudinal axis x.

Finger 22 located on first end 20 is designed to cooperated with second ring 18 in such manner that when second ring 18 undergoes a translation movement, linkage rod 19 is also caused to carry out a translation movement.

Finger 22 located on second end 21 is able to cooperate with a root 4 of blade 5. In particular, finger 22 is inserted for example in an orifice (not shown) that is created on root 4 of blade 5, the orifice being offset with regard to the primary axis of root 4 of blade 5. Accordingly, when linkage rod 19 undergoes a translation movement along an axis substantially parallel to longitudinal axis x, finger 22 located on second end 21 causes root 4 of blade 5 to rotate. This causes blade 5 to rotate about itself, that is to say about its primary axis (which is substantially perpendicular to axis x).

Each of interface means 12 that are located between member 9 and movement transformation means 8 are formed by a bearing 23. Bearing 23 comprises a first bushing 23a, which is mounted in fixed manner on first ring 13, and a second bushing 23b, which is mounted in fixed manner on second ring 18.

The function of this bearing 23 is to uncouple member 9 from movement transformation means 8 with regard to rotation by means of the ball bearings 24 comprised in bearing 23. At the same time, rod 11 executes a translation, this movement is transmitted to movement transformation means 8 via bushings 23a and 23b of bearing 23.

Positioning device 7a (or 7b respectively) advantageously cooperates with rotary nacelle 3a (or 3b respectively). Accordingly, blades 5 of a rotary nacelle (for example nacelle 3a) are positioned independently of the blades 5 of the other rotary nacelle (in our example, nacelle 3b).

Additionally, each rod 11 has a maximum extension and a minimum extension, each of which corresponds to a position of blade 5. For exemplary purposes, in FIG. 1 both rods 11 are at their minimum extension (that is to say both rods 11 are fully inserted inside body 10). This position may correspond for example with the "feathered" position for blades 5, equal to a measured angle close to 0° between the plane of rotation of blades 5 and the blades 5. Feathering of blades 5 is desirable for example when one wishes to reduce the thrust from turboprop engine 1 or cut it entirely.

Figure 2:
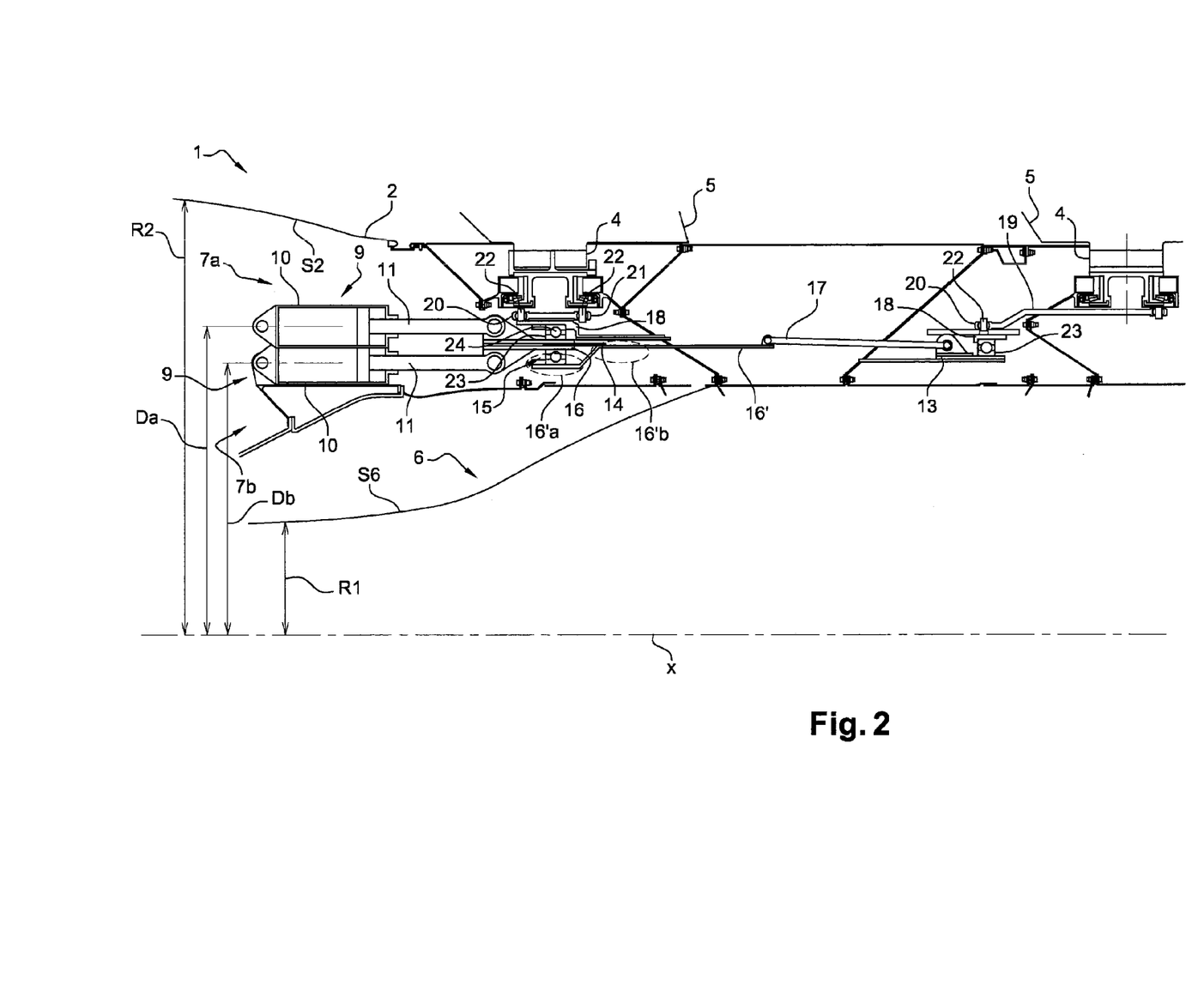

For comparison purposes, and as shown in FIG. 2, the two rods 11 are at their maximum extension (both rods 11 are projecting from body 10). This position might correspond for example with the "reverse" position of blades 5, equal to a measured angle close to −30° between the plane of rotation of blades 5 and the blades 5.

It is understood that these positions are not intended to be limiting in any way, and blades 5 may be positioned for example according to entirely different measured angles between the plane of rotation and blades 5, for example 45°. Such a position is commonly used during an aircraft's takeoff phase.

Figure 3:
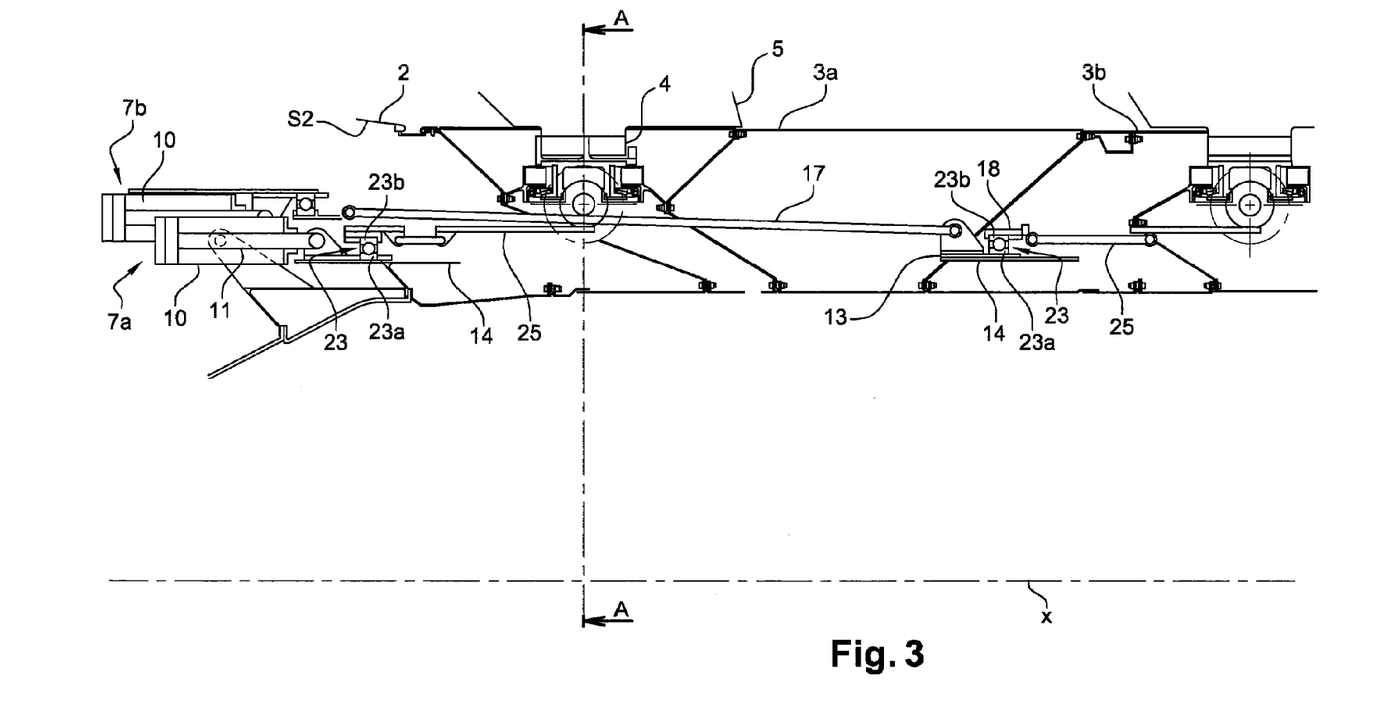
FIG. 3 shows schematically two blade positioning devices incorporated in a turboprop engine according to a second embodiment of the invention.
Figure 4:
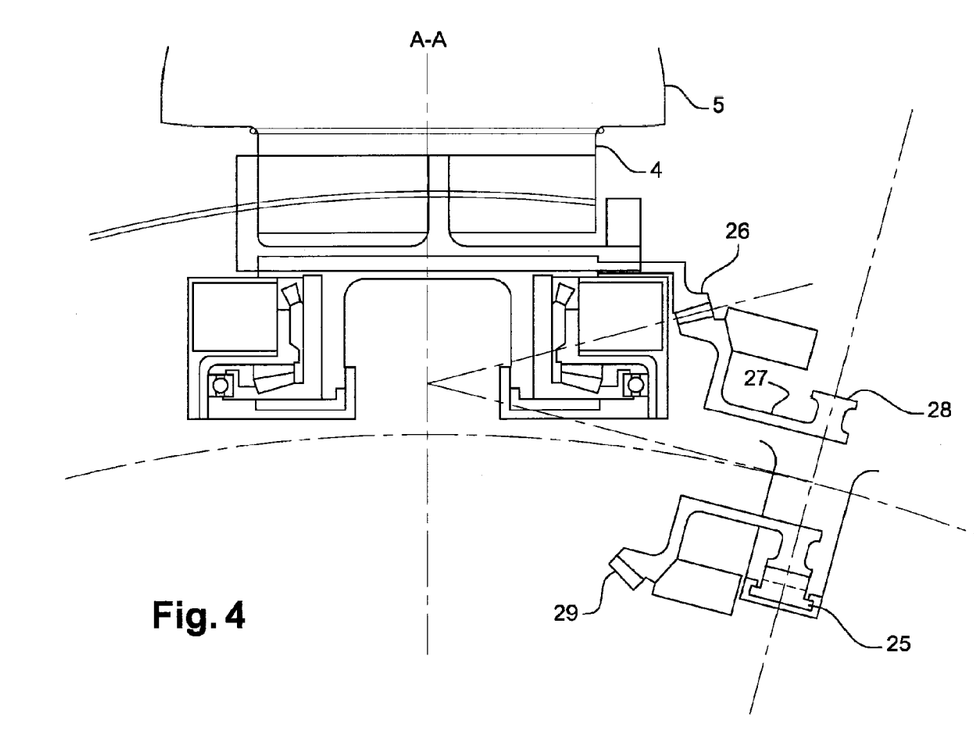
FIG. 4 is a cross section along line A-A through the device shown in FIG. 3.

FIG. 3 shows two positioning devices 7a and 7b according to a second embodiment of the invention. FIG. 4 shows a cross section along line A-A through positioning device 7a shown in FIG. 3.

Compared with positioning devices 7a and 7b shown in FIG. 1 or 2, the two positioning devices 7a and 7b shown in FIG. 3 differ in that each movement transformation means 8 particularly comprises a toothed rack 25, a bevel gearwheel 26 and a pinion 27.

According to this configuration, movement transformation means 8 comprise for each blade 5:

a toothed rack 25 attached fixedly to second ring 18, toothed rack 25 being substantially parallel with longitudinal axis x, a bevel gearwheel 26 arranged coaxially and fixedly with a root 4 of blade 5, and located at the base of root 4 of blade 5, a pinion 27 having an axis of rotation perpendicular to a perpendicular axis of said longitudinal axis x. In particular, pinion 27 has a first bevel gearwheel 28, which is designed to cooperate with said toothed rack 25 and a second bevel gearwheel 29, which is itself designed to cooperate with bevel gearwheel 26 which root 4 of blade 5 is provided.

The interactions between the different elements will now be described. For each blade 5, when rod 11 undergoes a translation movement, the movement is transmitted to second ring 18, which in turn causes toothed rack 25 to execute a translation movement. Through its geared engagement with first gearwheel 28, the toothed rack causes pinion 27 to rotate. In its turn, pinion 27 drives bevel gear 26 via second bevel gear 29. This ultimately causes blade 5 to pivot about its own axis.

Figure 5:
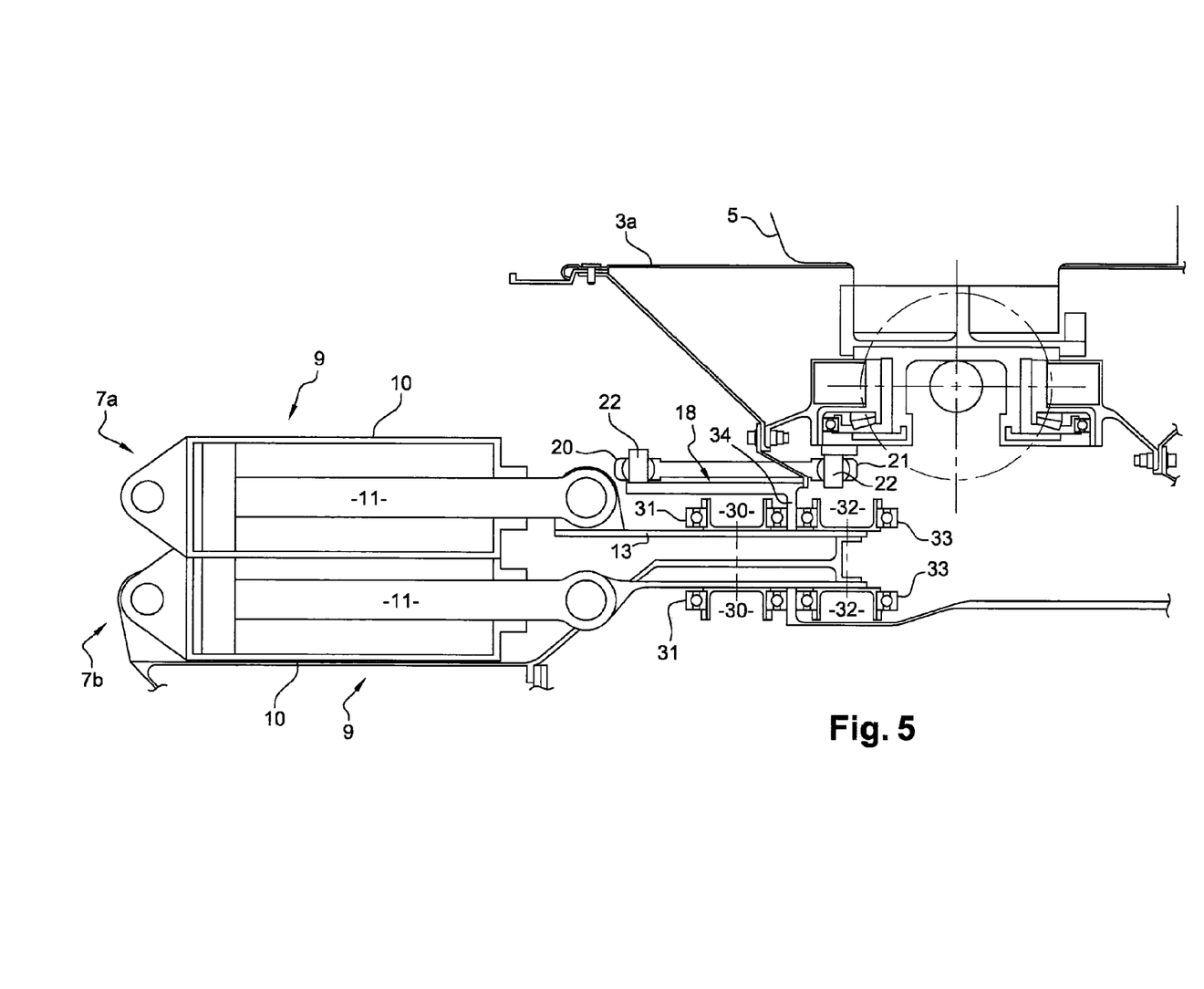
FIG. 5 shows schematically two blade positioning devices incorporated in a turboprop engine according to a third embodiment of the invention.

FIG. 5 represents a further variant of a positioning device integrated in a turboprop according to the invention. Compared with FIGS. 1 to 3, only one positioning device 7a is shown in full, this device being used to position blades 5 that are part of rotary nacelle 3a. The positioning device 7a shown in this figure differs from the positioning devices 7a shown in FIGS. 1 to 4 in that, for each blade 5, the interface means 12 comprise:

a first perpendicular shaft 30; first shaft 30 is arranged perpendicularly to longitudinal axis x and is also secured in fixed manner to first ring 13. First shaft 30 comprises a first coaxial bearing 31, a second perpendicular shaft 32; second shaft 32 is arranged perpendicularly to longitudinal axis x and is also secured in fixed manner to first ring 13. Perpendicular second shaft 32 comprises a second coaxial bearing 33.

According to such a configuration, second ring 18 comprises an internal ferrule 34. This is positioned between first bearing 31 and second bearing 33.

Thus, when rod 11 of member 9 is moved to the right (that is to say away from stationary nacelle 2 towards rotary nacelle 3a) with a translation movement, this translation movement is transmitted to movement transformation means 8 via first shaft 30; when rod 11 is moved to the left (that is to say away from rotary nacelle 3a towards stationary nacelle 2), this translation movement is transmitted to movement transformation means 8 via second shaft 32.

Moreover, when rotary nacelle 3a and movement transformation means 8 are subjected to a rotation movement, member 9 is uncoupled from the rotation movement of movement transformation means 8 via first and second coaxial bearings 31 and 33.

Figure 6:
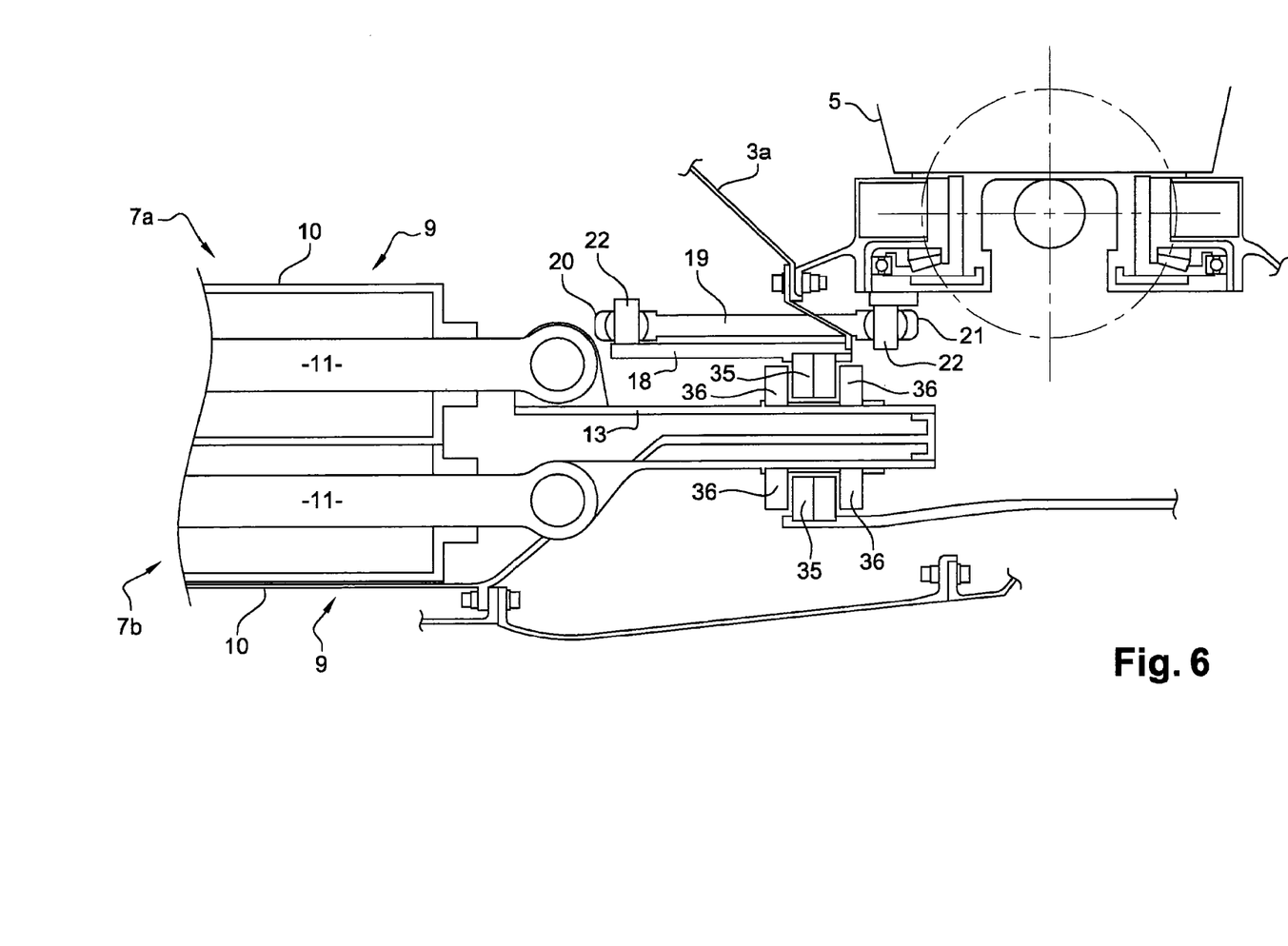
FIG. 6 shows schematically two blade positioning devices incorporated in a turboprop engine according to a fourth embodiment of the invention.

FIG. 6 illustrates a further variant of a positioning device integrated in a turboprop according to the invention. Compared with FIGS. 1 to 3, only one positioning device 7a is shown in full, this device being used to position blades 5 that are part of rotary nacelle 3a. The positioning device 7a shown in this figure differs from the positioning devices 7a shown in FIGS. 1 to 5 in that, for each blade 5, the interface means 12 comprise:

a primary magnet 35 formed attached in fixed manner to second ring 18. This primary magnet 35 is formed by a ferrule disposed on an internal wall of second ring 18, two secondary magnets 36, secured in fixed manner to first ring 13. These two secondary magnets 36 are each formed by a secondary ferrule disposed on the exterior wall of first ring 13.

The two secondary magnets 36 are separated from one another by primary magnet 35 such that when:

secondary magnets 36 are made to execute a translation movement via rod 11, this translation movement is transmitted to movement transformation means 8 by the magnetic repulsion between said primary magnet 35 and secondary magnets 36, rotary nacelle 3a and movement transformation means 8 undergo a rotary movement, member 9 is isolated from the rotary movement of movement transformation means 8.

Turboprop 1 is preferably equipped with two positioning devices 7a and 7b which particularly enable blades 5 of both rotary nacelles 3a and 3b to be positioned independently of one another and blades 5 to be positioned at a predetermined pitch angle.

It is understood that each positioning device 7a, 7b may advantageously comprise a plurality of members 9. Without limitation of the invention, each positioning device 7a, 7b preferably comprises 3, 4, 5 or 6 members 9.

The invention has been described in the preceding for exemplary purposes only, it is understood that one skilled in the art is capable of creating several different variants of the turboprop according to the invention, particularly with regard to the elements included in the positioning device that is created by the member, the movement transformation means and the interface means without exceeding the limits of the present patent.

The invention claimed is:

1. A turboprop provided with at least one blade positioning device, comprising:

a stationary nacelle, at least one rotary nacelle comprising a plurality of blade roots, a turbine, said stationary and rotary nacelles and said turbine being coaxial along a longitudinal axis, said blade positioning device comprising for each blade a movement transformation device constructed and arranged to transform a translation movement into a rotation movement, each movement transformation device being secured to said rotary nacelle and being adapted to pivot a blade, wherein said positioning device is placed between an inner surface of said stationary nacelle and an outer surface of said turbine, said positioning device comprising a member including a body secured to said stationary nacelle and a rod configured to slide along an axis substantially parallel to said longitudinal axis, wherein said movement transformation device comprises
a ring extending along the longitudinal axis,
a linkage extending essentially parallel to said longitudinal axis, said linkage being connected to a blade root and comprising a finger located at a first end and a finger located at a second end thereof, said fingers being disposed perpendicularly relative to the longitudinal axis,
said finger located on the first end being configured to cooperate with said to such effect that when said ring undergoes a translation movement, said linkage undergoes a translation movement,
said finger located on the second end being offset relative to a central axis of said blade root and being configured to cooperate with said blade root to such effect that when said linkage undergoes a translation movement, said blade root undergoes a rotation movement.

2. The turboprop according to claim 1, wherein said positioning device comprises an interface located between said member and said movement transformation device, said interface being constructed and arranged to:
transmit a translation movement of said rod to said movement transformation device, uncouple said member from said movement transformation device in such manner that when said rotary nacelle is rotating the member is not caused to rotate by said movement transformation device.

3. The turboprop according to claim 2, wherein said rod is constructed and arranged to cooperate with a first ring extending along the longitudinal axis, said first ring being configured to be moved in translation under the influence of said rod, said first ring being guided in translation by a guiding ring extending along the longitudinal axis secured in fixed manner to said stationary nacelle.

4. The turboprop according to claim 3, wherein said interface is formed by a bearing extending along the longitudinal axis, comprising a first bushing mounted in fixed manner on said first ring, and a second bushing mounted in fixed manner on said ring of said movement transformation device such that:
when said rod of said member undergoes a translation movement, said translation is transmitted to said movement transformation device via said bearing,
when said rotary nacelle and said movement transformation device undergo a rotation movement, said member is uncoupled from the rotation movement via said bearing.

5. The turboprop according to claim 3, wherein for each blade said interface comprises:
a first shaft perpendicular to said longitudinal axis, connected in fixed manner to said first ring, said first shaft comprising a first coaxial bearing,
a second shaft perpendicular to said longitudinal axis, connected in fixed manner to said first ring, said second shaft comprising a second coaxial bearing,
said ring of said movement transformation device comprising an internal ferrule that separates said first and second coaxial bearings such that:
when said rod of said member undergoes a translation movement, said translation is transmitted to said movement transformation device via the first or second coaxial bearing,
when said rotary nacelle and said movement transformation device undergo a rotary movement, said member is uncoupled from the rotary motion of said movement transformation device via said first and second coaxial bearings.

6. The turboprop according to claim 3, wherein for each blade said interface comprises:
a primary magnet formed by a first ferrule attached in fixed manner to said ring of said movement transformation device, said primary magnet being disposed on an internal wall of said ring of said movement transformation device,
two secondary magnets, each of which is formed by a second ferrule, attached in fixed manner to said first ring, said two secondary magnets being disposed on an external wall of said first ring and being kept apart from one another by said primary magnet, such that:
when said secondary magnets undergo a translation movement via said rod, the translation movement is transmitted to said movement transformation device by the magnetic repulsion between said primary and secondary magnets,
when said rotary nacelle and said movement transformation device undergo a rotary movement, said member is isolated from said rotary movement.

7. The turboprop according to claim 1, wherein said positioning device comprises a number of members from three to six.

8. The turboprop according to claim 1, comprising a second rotary nacelle that includes a plurality of blade roots, said plurality of blade roots of said second rotary nacelle being configured so as to be positioned by a second positioning device.

9. A turboprop provided with at least one blade positioning device, comprising:
a stationary nacelle,
at least one rotary nacelle comprising a plurality of blade roots,
a turbine, said stationary and rotary nacelles and said turbine being coaxial along a longitudinal axis,
said blade positioning device comprising for each blade a movement transformation device constructed and arranged to transform a translation movement into a rotation movement, each movement transformation device being secured to said rotary nacelle and being adapted to pivot a blade,
wherein said positioning device is placed between an inner surface of said stationary nacelle and an outer surface of said turbine, said positioning device comprising a member including a body secured to said stationary nacelle and a rod configured to slide along an axis substantially parallel to said longitudinal axis, and
wherein said movement transformation device comprises:
a ring extending along the longitudinal axis,
for each blade:
toothed rack being connected fixedly to said ring, said toothed rack being essentially parallel to said longitudinal axis,
a bevel gearwheel that is coaxial with a predetermined blade root and located at the base of said blade root,
a pinion having an axis of rotation that is perpendicular to a perpendicular axis of said longitudinal axis, comprising:
a first gearwheel configured to cooperate with said toothed rack,
a second bevel gearwheel configured to cooperate with said bevel gearwheel.

10. A turboprop comprising:
a first nacelle;
a second nacelle that is configured to rotate relative to the first nacelle, the second nacelle comprising a plurality of blade roots;
a turbine, said first and second nacelles and said turbine being coaxial along a longitudinal axis; and
a blade positioning device arranged between an inner surface of said first nacelle and an outer surface of said turbine, the blade positioning device comprising for each blade a movement transformation device constructed and arranged to transform a translation movement into a rotation movement, the movement transformation device being secured to said second nacelle and being adapted to pivot the blade, and a member including a body secured to said first nacelle and a rod configured to slide along an axis substantially parallel to said longitudinal axis,
wherein said movement transformation device comprises
a ring extending along the longitudinal axis,
a linkage extending essentially parallel to said longitudinal axis, said linkage being connected to a blade root and comprising a finger located at a first end and a finger located at a second end thereof, said fingers being disposed perpendicularly relative to the longitudinal axis, said finger located on the first end being configured to cooperate with said ring to such effect that when said ring undergoes a translation movement, said linkage undergoes a translation movement, said finger located on the second end being offset relative to a central axis of said blade root and being configured to cooperate with said blade root to such effect that when said linkage undergoes a translation movement, said blade root undergoes a rotation movement.

11. The turboprop according to claim 10, wherein said positioning device comprises an interface located between said member and said movement transformation device, said interface being constructed and arranged to:

transmit a translation movement of said rod to said movement transformation device, uncouple said member from said movement transformation device in such manner that when said second nacelle rotates the member is not caused to rotate by said movement transformation device.

* * * * *